US006950092B2

(12) United States Patent
Buss

(10) Patent No.: US 6,950,092 B2
(45) Date of Patent: Sep. 27, 2005

(54) INPUT DEVICE WITH MULTIPLE CONTROLS HAVING INTERCHANGEABLE FUNCTIONALITY

(75) Inventor: Alan Richard Buss, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 09/794,745

(22) Filed: Feb. 27, 2001

(65) Prior Publication Data

US 2002/0118164 A1 Aug. 29, 2002

(51) Int. Cl.$^7$ ................................................ G09G 5/08
(52) U.S. Cl. ...................... 345/161; 345/156; 345/157; 345/163; 345/168; 715/830
(58) Field of Search ................................ 345/156–169, 345/173, 184, 828–830, 856; 715/830; 341/26, 20

(56) References Cited

U.S. PATENT DOCUMENTS

| | | | | |
|---|---|---|---|---|
| 5,513,268 A | * | 4/1996 | Bironas et al. ............. | 381/109 |
| 5,600,314 A | * | 2/1997 | Oliveros ...................... | 341/26 |
| 5,615,083 A | * | 3/1997 | Burnett ....................... | 361/686 |
| 5,682,151 A | * | 10/1997 | Oliveros ...................... | 341/23 |
| 5,771,038 A | * | 6/1998 | Wang .......................... | 345/163 |
| 5,790,435 A | * | 8/1998 | Lewis et al. ................... | 716/6 |
| 5,880,685 A | * | 3/1999 | Weeks .......................... | 341/22 |
| 5,883,615 A | * | 3/1999 | Fago et al. .................. | 345/156 |
| 5,959,616 A | | 9/1999 | Challener ................... | 345/179 |
| 5,982,356 A | | 11/1999 | Akiyama ..................... | 345/161 |
| 6,031,531 A | * | 2/2000 | Kimble ........................ | 345/862 |
| 6,064,370 A | | 5/2000 | Wang et al. ................. | 345/163 |
| 6,088,022 A | * | 7/2000 | Rakoski ...................... | 345/168 |
| 6,107,990 A | * | 8/2000 | Fleming, III ................ | 345/157 |
| 6,130,664 A | | 10/2000 | Suzuki ........................ | 345/158 |
| 6,157,368 A | * | 12/2000 | Fager ........................... | 345/156 |
| 6,204,837 B1 | * | 3/2001 | Smith .......................... | 345/157 |
| 6,205,021 B1 | * | 3/2001 | Klein et al. .................. | 361/683 |
| 6,211,861 B1 | * | 4/2001 | Rosenberg et al. ......... | 345/163 |
| 6,246,411 B1 | * | 6/2001 | Strauss ........................ | 345/863 |
| 6,300,938 B1 | * | 10/2001 | Culver ........................ | 345/156 |

(Continued)

OTHER PUBLICATIONS

IBM Technical Disclosure Bulletin, *Pointing Device with Scrolling Facility*, vol. 40, No. 11, Nov. 1997, p. 1–2.

IBM Technical Disclosure Bulletin, *Separate Pointing Device with Low–Displacement Data Input*, vol. 39, No. 3, Mar. 1996, p. 113–114.

IBM Technical Disclosure Bulletin, *Integrated Voice Input and Pointer Device for Multimedia Applications*, vol. 37, No. 5, May 1994, p. 567–568.

IBM Technical Disclosure Bulletin, *PS/2 Mouse: Side Buttons for Direct Manipulation using Opposing Thumb*, No. 10b, Mar. 1992, p. 302.

*Primary Examiner*—Jimmy H. Nguyen
*Assistant Examiner*—Leonid Shapiro
(74) *Attorney, Agent, or Firm*—Duke W. Yee; Stephen Calogero; Stephen R. Tkacs

(57) ABSTRACT

A data processing system input device is described. The input device includes a first control device, a second control device, and a device driver. The first control device is capable of moving a cursor in accordance with a direction and magnitude of forces applied to the first control device. The second control device is capable of controlling scrolling in accordance with a direction and magnitude of forces applied to the second control device. The device driver is capable of switching functionality of the first control device with the functionality of the second control device. When the functionality of the first control devices is switched with the functionality of the second control device, the second control device moves the cursor and the first control device controls scrolling.

10 Claims, 7 Drawing Sheets

U.S. PATENT DOCUMENTS

| | | | |
|---|---|---|---|
| 6,424,335 B1 * | 7/2002 | Kim et al. | 345/158 |
| 6,429,543 B1 * | 8/2002 | Desai | 307/10.1 |
| 6,469,722 B1 * | 10/2002 | Kinoe et al. | 345/837 |
| 6,480,184 B1 * | 11/2002 | Price | 345/163 |
| 6,525,306 B1 * | 2/2003 | Bohn | 250/221 |
| 6,539,243 B1 * | 3/2003 | Kimura et al. | 455/550.1 |
| 6,563,824 B1 * | 5/2003 | Bhatia et al. | 370/392 |
| 2001/0017604 A1 * | 8/2001 | Jacobsen et al. | 345/27 |
| 2002/0084986 A1 * | 7/2002 | Armstrong | 345/163 |
| 2002/0196231 A1 * | 12/2002 | Dobies et al. | 345/161 |

* cited by examiner

INPUT DEVICE WITH MULTIPLE CONTROLS HAVING INTERCHANGEABLE FUNCTIONALITY

FIELD OF THE INVENTION

The present invention relates generally to data processing systems, and more particularly to input devices for inputting data into data processing systems. Still more particularly, the present invention relates to a computer system input device having a first control device for controlling a cursor, and a second control device for controlling scrolling, where functionality of the first and second control devices may be switched.

BACKGROUND OF THE INVENTION

Input devices, such as keyboards, are utilized to input data into a computer system. The use of a pointing device, such as a mouse, simplifies many computer operations. However, for certain operations, such as scrolling of text and images on a computer screen, conventional input devices have shortcomings.

It is known to include a cursor control device on either a keyboard or a mouse. The cursor control device is a joystick-type control capable of moving a cursor. Such a cursor control device is known as a "Trackpoint™". Trackpoint™ is a trademark of International Business Machines Corporation.

It is also known to include a scroll device on a mouse. A scroll device is capable of scrolling the data currently being displayed. A scroll device controls scrolling and does not change the current position of the cursor.

A user may utilize an input device, such as a keyboard, in order to input data into a computer system. If the user wishes to scroll the currently displayed information, the user must use the arrow keys, or move his/her hand to the mouse, move the cursor to a scroll bar, and hold down the mouse key. If the mouse includes a scroll device, the user must move his/her hand to the mouse, and move the scroll device. If the user wishes to move the cursor, the user may use the keyboard's arrow keys, move a Trackpoint™ device included in between the G and H keys of the keyboard, or move his/her hand to the mouse, and move the mouse.

Therefore, a need exists for a computer system input device including a cursor control device and a scroll control device, where the functionality of the cursor control device may be switched with the functionality of the scroll control device.

SUMMARY OF THE INVENTION

A data processing system input device is described. The input device includes a first control device, a second control device, and a device driver. The first control device is capable of moving a cursor in accordance with a direction and magnitude of forces applied to the first control device. The second control device is capable of controlling scrolling in accordance with a direction and magnitude of forces applied to the second control device. The device driver is capable of switching functionality of the first control device with the functionality of the second control device. When the functionality of the first control devices is switched with the functionality of the second control device, the second control device moves the cursor and the first control device controls scrolling.

The above as well as additional object, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The invention is preferably realized using a well-known computing platform, such as an IBM RS/6000 workstation running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

The present invention is an input device for inputting information into a computer system. The input device includes a first control device and a second control device. The first control device is typically utilized as a cursor control device. The cursor control device is capable of moving the cursor. The cursor control device may be implemented utilizing a Trackpoint™ device. The second control device is typically utilized as a scroll control device. The scroll control device is capable of scrolling the data currently displayed on a computer screen without moving the current location of the cursor. The scroll control device may be implemented utilizing a joystick-type input stick, such as a Trackpoint.

A user may select to change the functionality of the first control device with that of the second control device. When a user selects to switch the functionality, the first control device becomes capable of being a scroll control device capable of controlling scrolling without moving the cursor, while the second control device becomes capable of being a cursor control device, moving the current location of the cursor.

Figure 2:
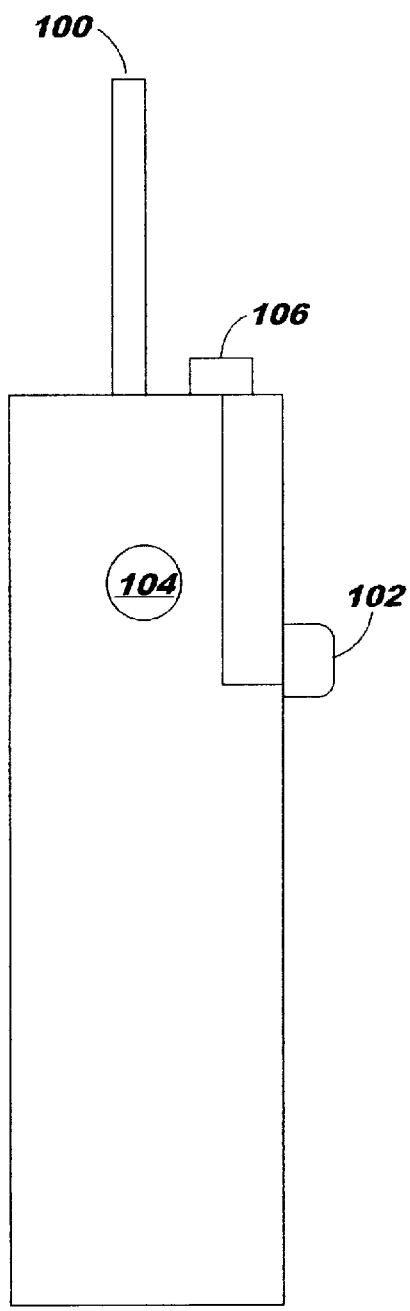
FIG. 2 is a side view of the mouse of FIG. 1 in accordance with the present invention.
Figure 1:
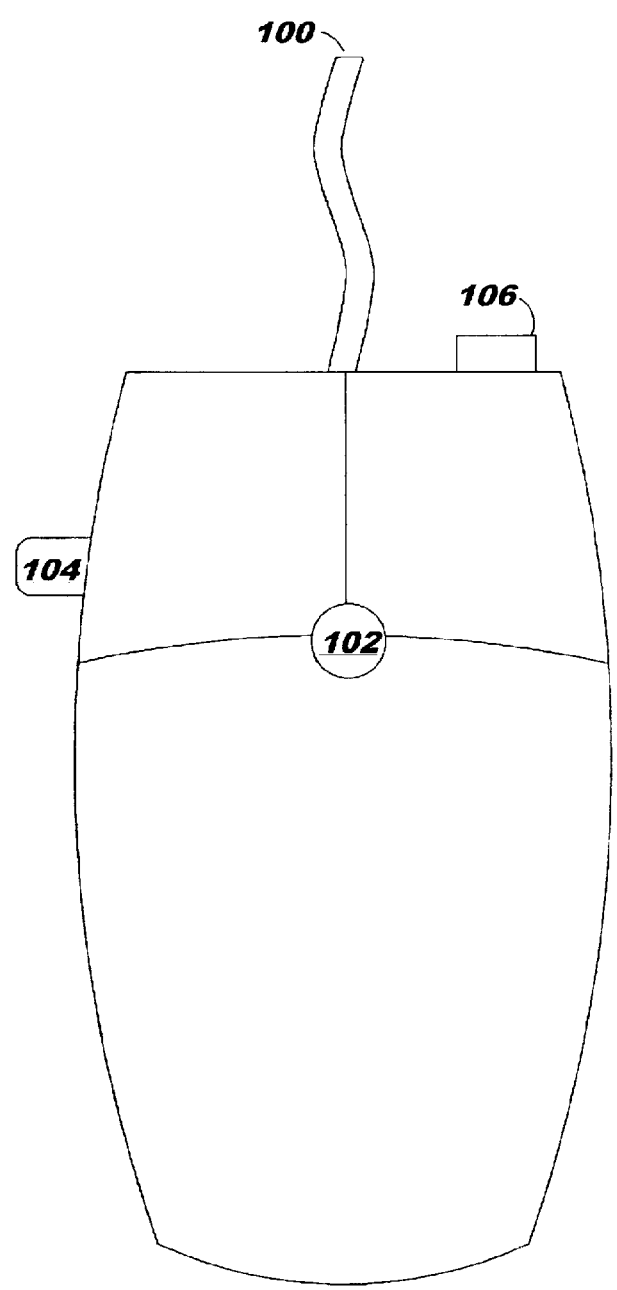
FIG. 1 is a top view of a mouse which includes a first control device and a second control device, where the functionality of the control devices may be interchanged in accordance with the present invention.

FIG. 1 is a top view of a mouse 100 which includes a first control device 102 and a second control device 104, where the functionality of the control devices may be interchanged in accordance with the present invention. FIG. 2 is a side view of the mouse of FIG. 1 in accordance with the present invention.

Either control device, or both devices, may be implemented utilizing a stick-type input device such as a joystick. Those skilled in the art will recognize that other types of input switches may be used. For example, a thumb switch may be used. Those skilled in the art will also recognize that these control devices may be located anywhere on the mouse. For example, control device 104 may be moved to the top of the mouse, next to delete key 106.

Further, mouse 100 may be manufactured in any shape. For example, mouse 100 may be manufactured as a sphere. In this case, mouse 100 may be a handheld device. When mouse 100 is a sphere, the control devices may be utilized to move the cursor and control scrolling. In such a case where a cursor control device is included, the mouse ball could be removed because it is no longer necessary to move the cursor.

Initially, if a user does not select to interchange the functionality of the devices, first control device 102 is a cursor control device, and second control device 104 is a scroll control device. If a user has selected to interchange the functionality of the control devices, first control device 102 is a scroll control device, and second control device 104 is a cursor control device.

First control device 102 may be a joystick-type stick device such as a Trackpoint™, or any other type of cursor control device. Second control device 104 may be a scroll wheel, a joystick-type stick device such as a Trackpoint™, or any other type of scroll control device. In a preferred embodiment both first control device 102 and second control device 104 are each implemented using a joystick-type stick control device such as a Trackpoint™.

Mouse 100 also includes a delete key 106. Delete key 106 functions as does a delete or backspace key included in a typical keyboard.

A single control device may be included on an input device which has switchable functions. For example, a single control device 102 may be included in mouse 100 which does not include control device 104. In this case, the single control device would be initially set to perform a first function such as cursor movement control. Upon a selection of a switch function, the control device would then be capable of performing a second function such as scrolling. The control device would then perform the scrolling function until the switch function was again selected.

Figure 3:
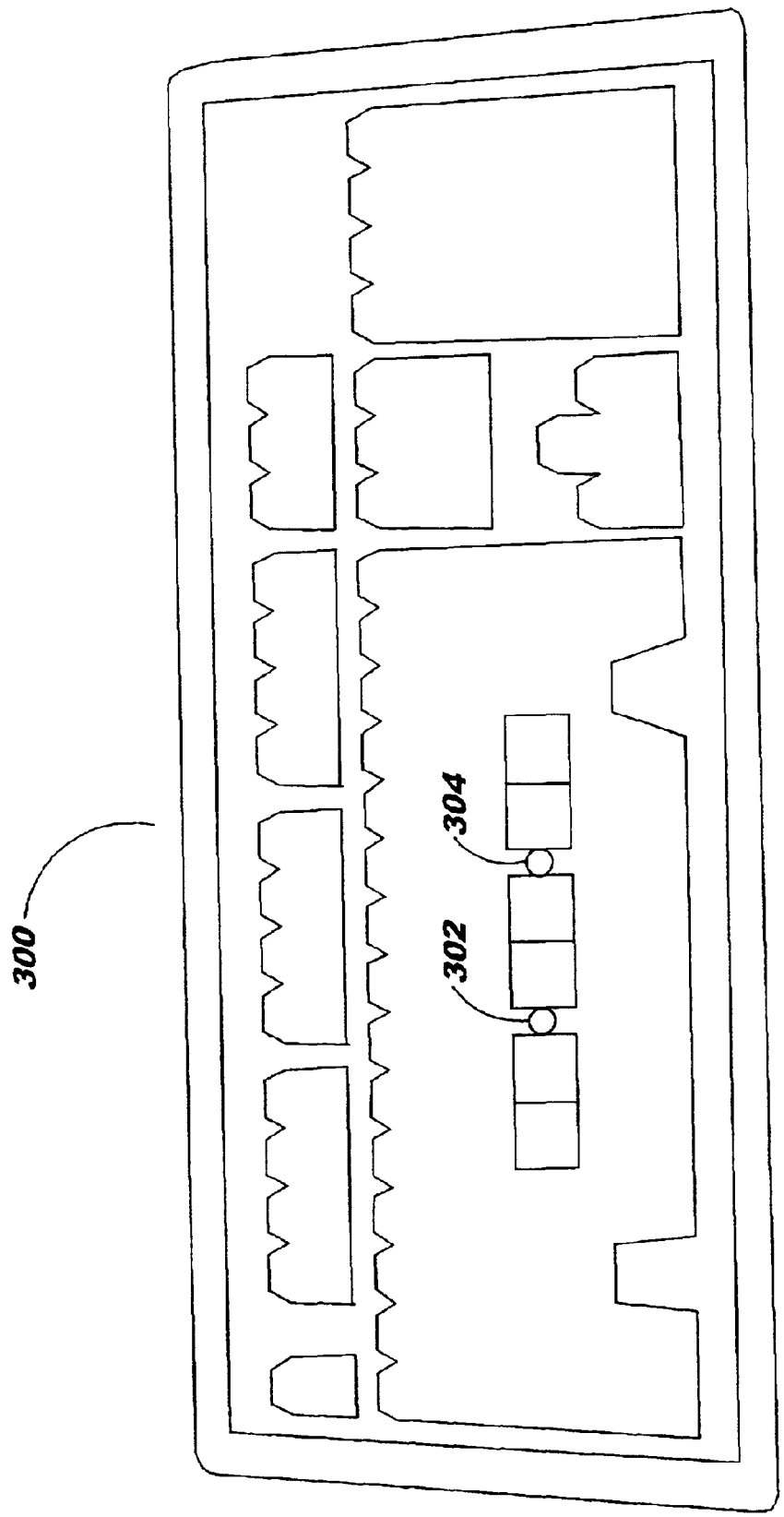
FIG. 3 is a top view of a keyboard which includes a first control device and a second control device, where the functionality of the control devices may be switched in accordance with the present invention.

FIG. 3 is a top view of a keyboard 300 which includes a first control device 302 and a second control device 304, where the functionality of the control devices may be switched in accordance with the present invention. First control device 302 and second control device 304 may be located anywhere on keyboard 300. In the depicted embodiment, to permit ease of use, first control device 302 is preferably located between the F and G keys, and second control device 304 is preferably located between the H and J keys. In a preferred embodiment, both first control device 302 and second control device 304 are each implemented using a joystick-type stick control device such as a Trackpoint™.

Initially, if a user does not select to interchange the functionality of the devices, first control device 302 is a cursor control device, and second control device 304 is a scroll control device. If a user has selected to interchange the functionality of the control devices, first control device 302 is a scroll control device, and second control device 304 is a cursor control device.

Either a mouse, a keyboard, or both a mouse and a keyboard may be modified to include a first device and a second device where the functionality of the devices may be interchanged.

Figure 4:
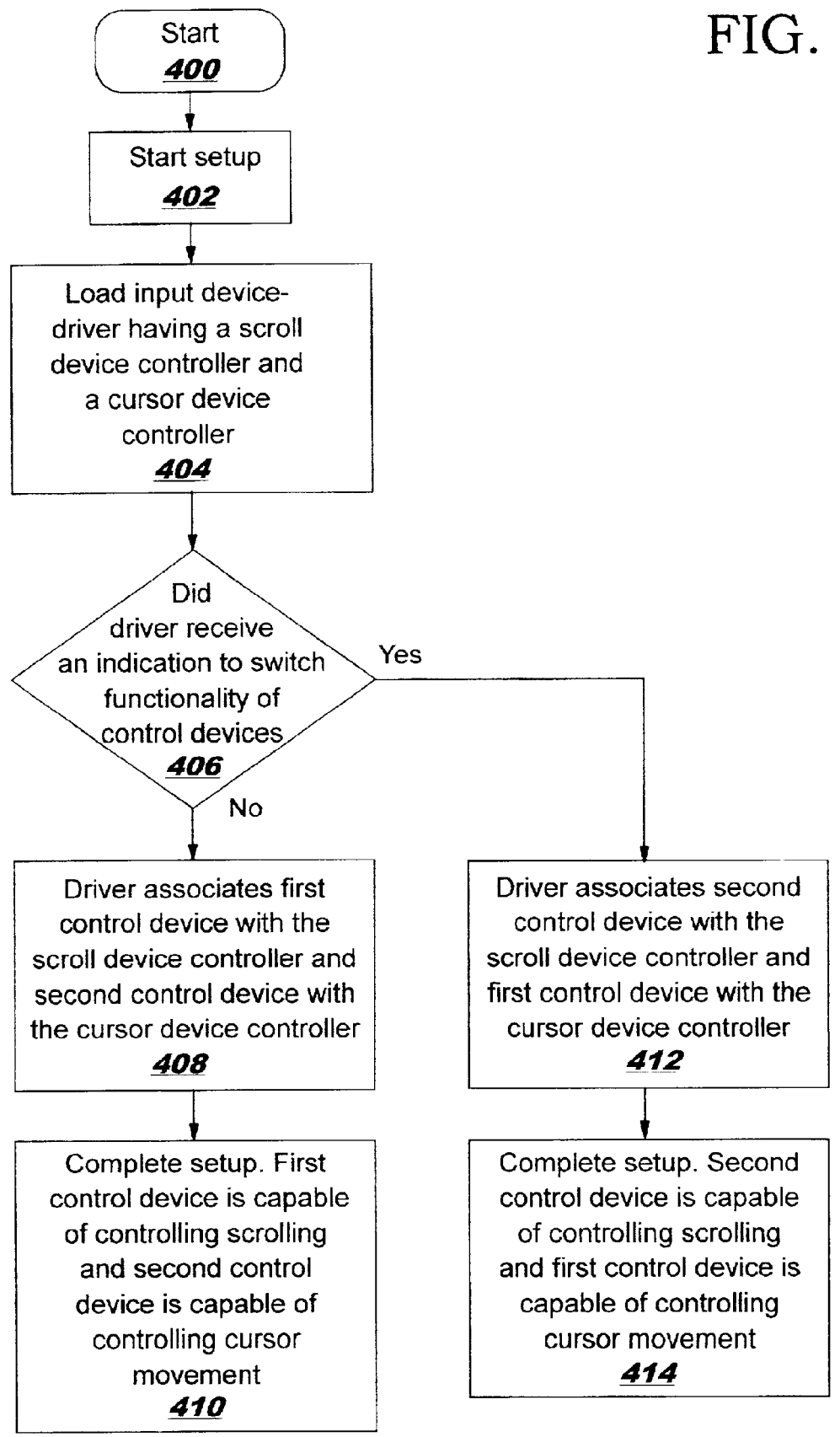
FIG. 4 is a high level flow chart which depicts associating a cursor function with a first control device, associating a scroll function with a second control device, and switching the functionality in accordance with the present invention.

FIG. 4 is a high level flow chart which depicts associating a cursor function with a first control device, associating a scroll function with a second control device, and switching the functionality in accordance with the present invention. The process starts as depicted by block 400 and thereafter passes to block 402 which illustrates starting the setup of a computer system which includes the present invention. Thereafter, block 404 depicts loading an input device driver, such as a mouse device driver or a keyboard device driver. This device driver includes a controller for controlling a scroll control device, and a controller for controlling a cursor control device.

Next, block 406 illustrates a determination of whether or not the driver has received an indication from a user to switch the functionality of the control devices. If a determination is made that no indication has been received, the process passes to block 408 which depicts the driver associating the first control device with the cursor device controller and the second control device with the scroll device controller. Thereafter, block 410 illustrates a completion of the setup. The first control device is, therefore, capable of controlling the cursor movement, and the second control device is capable of controlling the scrolling.

Referring again to block 406, if a determination is made that an indication has been received, the process passes to block 412 which depicts the driver associating the second control device with the cursor device controller, and the first control device with the scroll device controller. Thereafter, block 414 illustrates a completion of the setup. The second control device is, therefore, capable of controlling the cursor movement, and the first control device is capable of controlling the scrolling.

Figure 5:
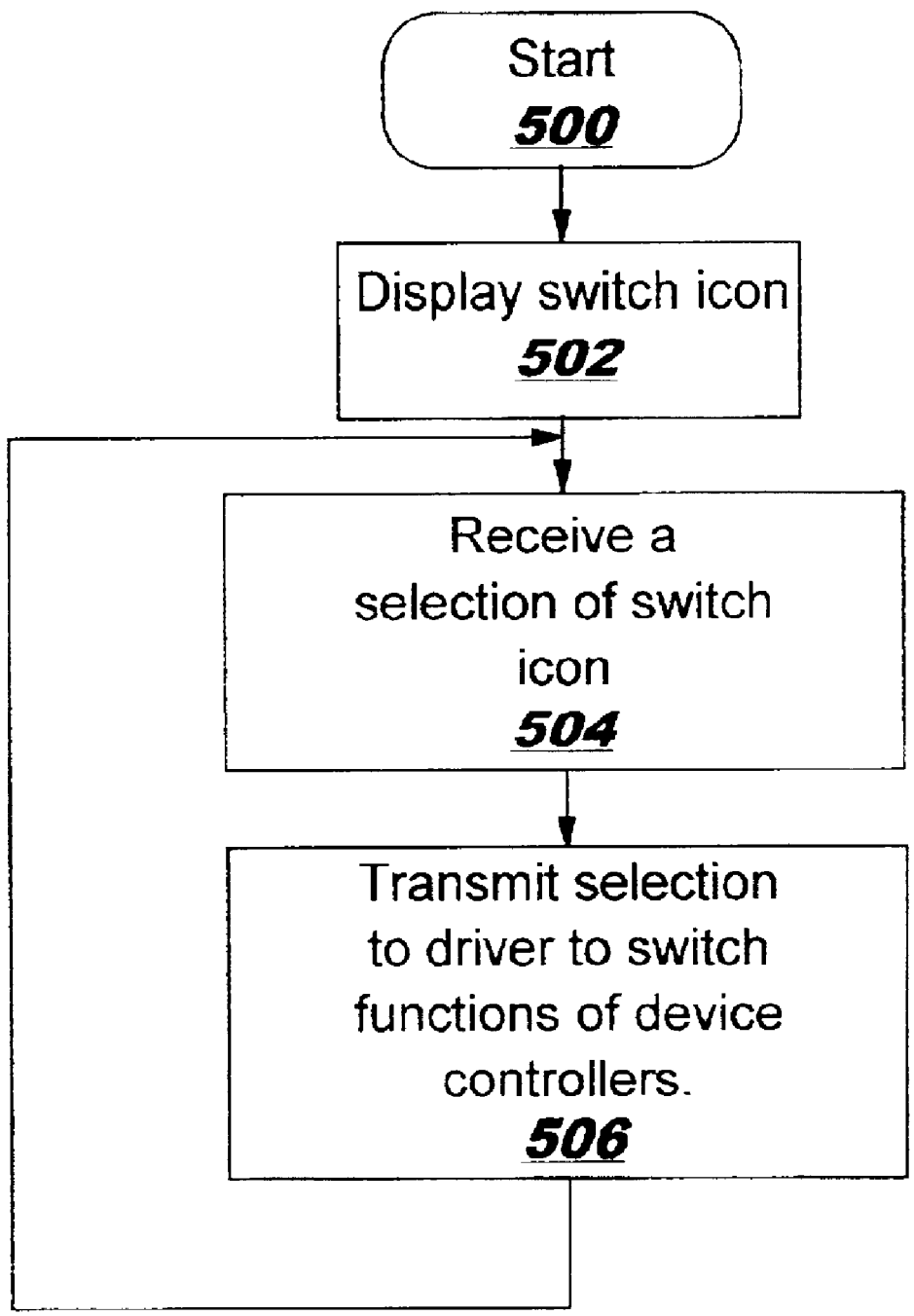
FIG. 5 is a high level flow chart which illustrates switching the functionality of two control devices included with an input device in response to a selection of an icon in response to the present invention.

FIG. 5 is a high level flow chart which depicts switching the functionality of two control devices in accordance with the method and system of the present invention. The process starts as depicted by block 500 and thereafter passes to block 502 which illustrates displaying a switch icon to a user. Next, block 504 illustrates a receipt of the switch icon. Thereafter, block 506 depicts a transmission of this selection to the driver to cause the driver to switch the functions of the device controller. The functions of the device controllers are then toggled between the first control device and the second control device. For example, if the first control device is initially controlled by the scroll device controller and the second control device is controlled by the cursor device controller, the first control device will now be controlled by the cursor device controller and the second control device will be controlled by the scroll device controller so that the first control device is capable of controlling cursor movement and the second control device is capable of controlling scroll movement.

Those skilled in the art will recognize that any type of selection method may be utilized to input a selection of a switch function. For example, instead of providing a switch icon, the system may switch the functionality of the devices upon a receipt of a particular input key sequence or a button on the mouse and/or keyboard.

Figure 6:
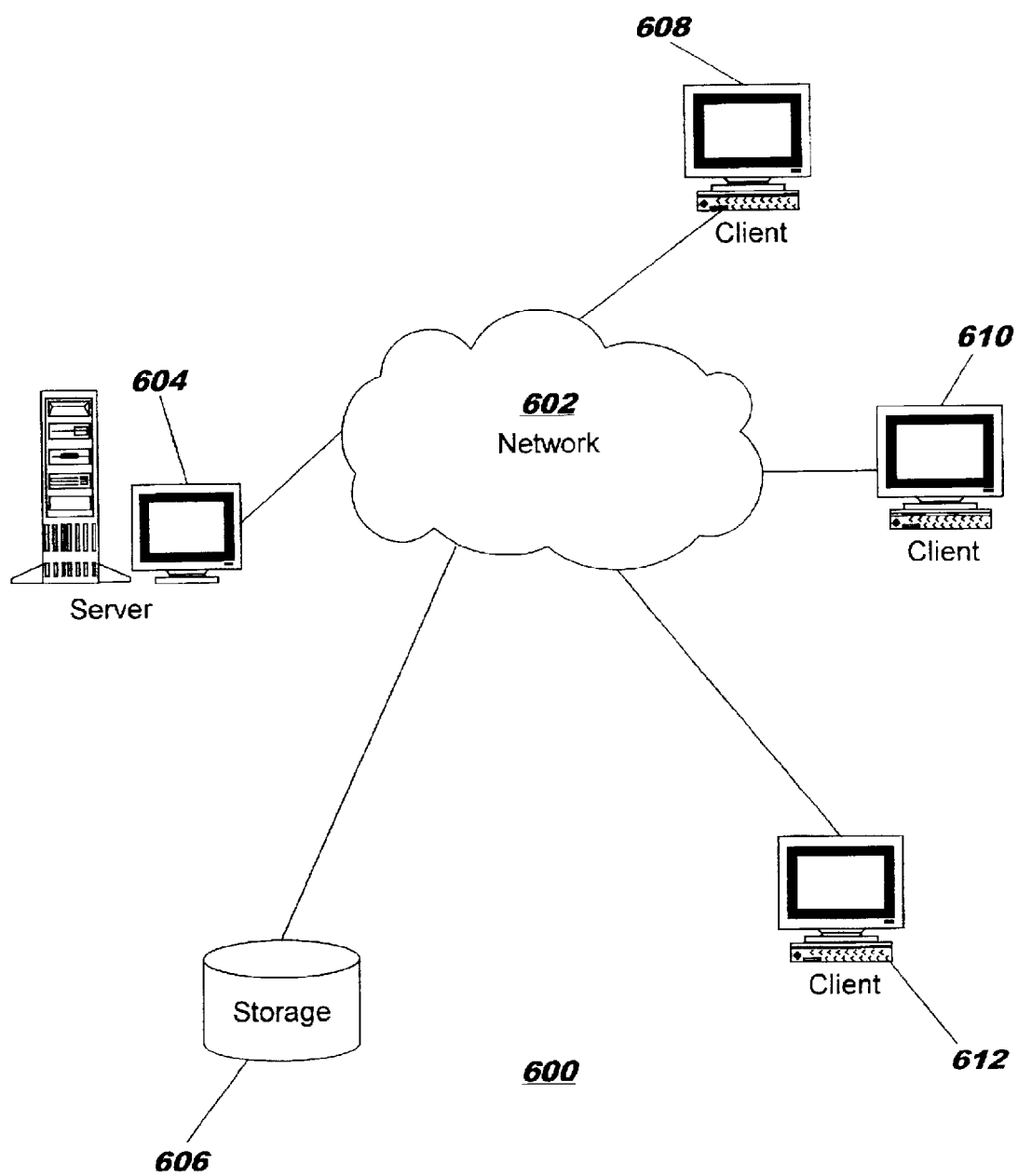
FIG. 6 is pictorial representation of a distributed data processing system in which the present invention may be implemented.

With reference now to the figures, and in particular with reference to FIG. 6, a pictorial representation of a distributed data processing system is depicted in which the present invention may be implemented. Distributed data processing system 600 is a network of computers in which the present invention may be implemented. Distributed data processing system 600 contains network 602, which is the medium used to provide communications links between various devices and computers connected within distributed data processing system 600. Network 602 may include permanent connections, such as wire or fiber optic cables, or temporary connections made through telephone connections.

In the depicted example, server 604 is connected to network 602, along with storage unit 606. In addition, clients 608, 610, and 612 are also connected to network 602. These clients, 608, 610, and 612, may be, for example, personal computers, network computers, personal digital assistants, data network compatible cellular devices, cable or satellite TV set-top boxes, Internet ready game consoles, and the like. For purposes of this application, a network computer is any computer coupled to a network which receives a program or other application from another computer coupled to the network. In the depicted example, server 604 provides data, such as boot files, operating system images and applications, to clients 608–612. Clients 608, 610, and 612 are clients to server 604. Distributed data processing system 600 may include additional servers, clients, and other devices not shown.

Distributed data processing system 600 may be the Internet, with network 602 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 600 also may be implemented as a number of different types of networks such as, for example, an intranet or a local area network. FIG. 6 is intended as an example and not as an architectural limitation for the processes of the present invention.

Figure 7:
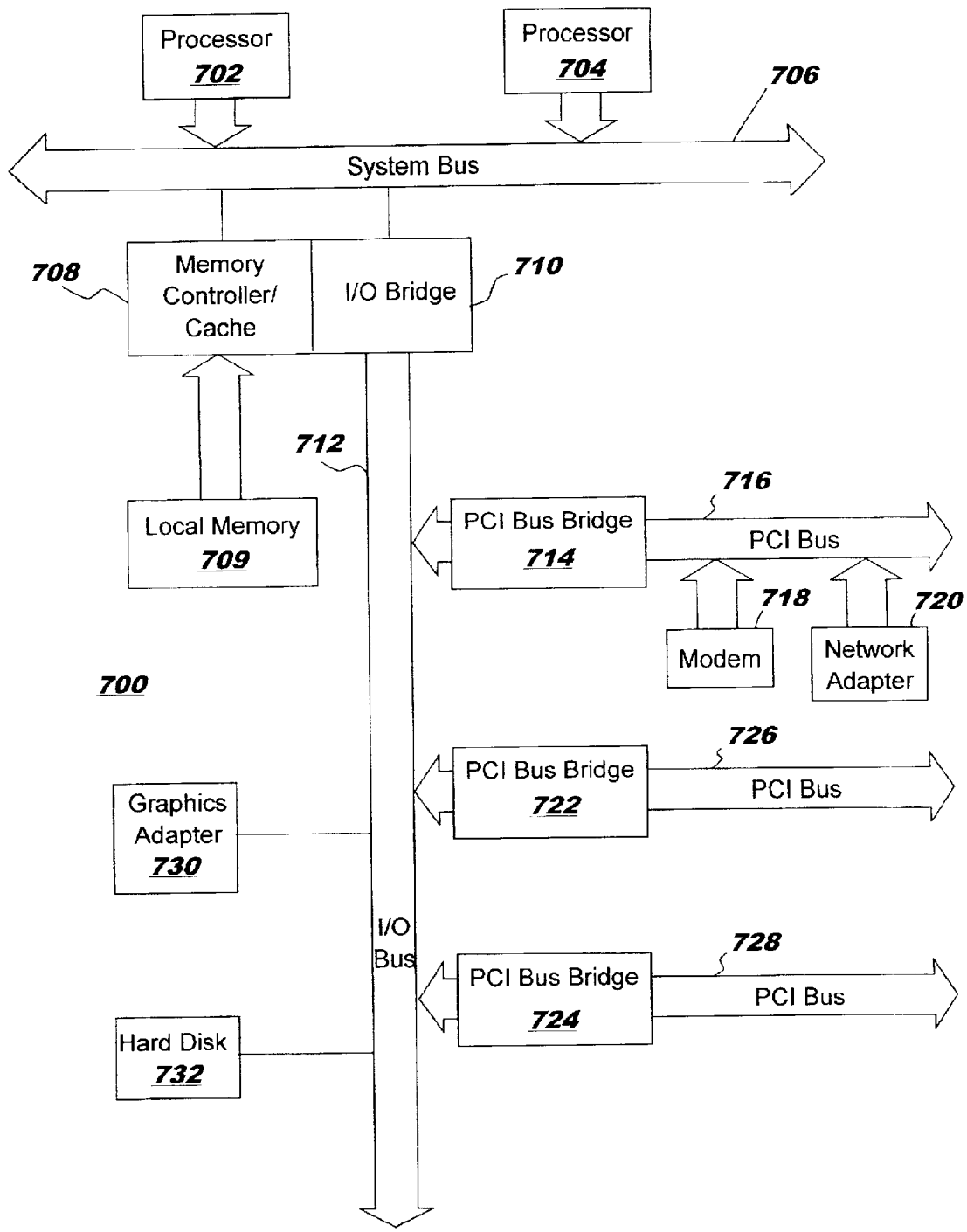
FIG. 7 is a block diagram of a data processing system which may be implemented as a server in which the present invention may be included in accordance with the present invention.

FIG. 7 illustrates a block diagram of a data processing system which may be implemented as a server, such as server 604 in FIG. 6, in accordance with the present invention. Data processing system 700 may be a symmetric multiprocessor (SMP) system including a plurality of processors 702 and 704 connected to system bus 706. Alternatively, a single processor system may be employed. Also connected to system bus 706 is memory controller/cache 708, which provides an interface to local memory 709. I/O bus bridge 710 is connected to system bus 706 and provides an interface to I/O bus 712. Memory controller/cache 708 and I/O bus bridge 710 may be integrated as depicted. Peripheral component interconnect (PCI) bus bridge 714 connected to I/O bus 712 provides an interface to PCI local bus 716. A number of modems 718–720 may be connected to PCI bus 716. Typical PCI bus implementations will support four PCI expansion slots or add-in connectors. Communications links to network computers 608–612 in FIG. 6 may be provided through modem 718 and network adapter 720 connected to PCI local bus 716 through add-in boards. Additional PCI bus bridges 722 and 724 provide interfaces for additional PCI buses 726 and 728, from which additional modems or network adapters may be supported. In this manner, server 700 allows connections to multiple network computers. A memory mapped graphics adapter 730 and hard disk 732 may also be connected to I/O bus 712 as depicted, either directly or indirectly.

Those of ordinary skill in the art will appreciate that the hardware depicted in FIG. 7 may vary. For example, other peripheral devices, such as optical disk drives and the like, also may be used in addition to or in place of the hardware depicted. The depicted example is not meant to imply architectural limitations with respect to the present invention. The data processing system depicted in FIG. 7 may be, for example, an IBM RISC/System 6000, a product of International Business Machines Corporation in Armonk, N.Y., running the Advanced Interactive Executive (AIX) operating system.

Figure 8:
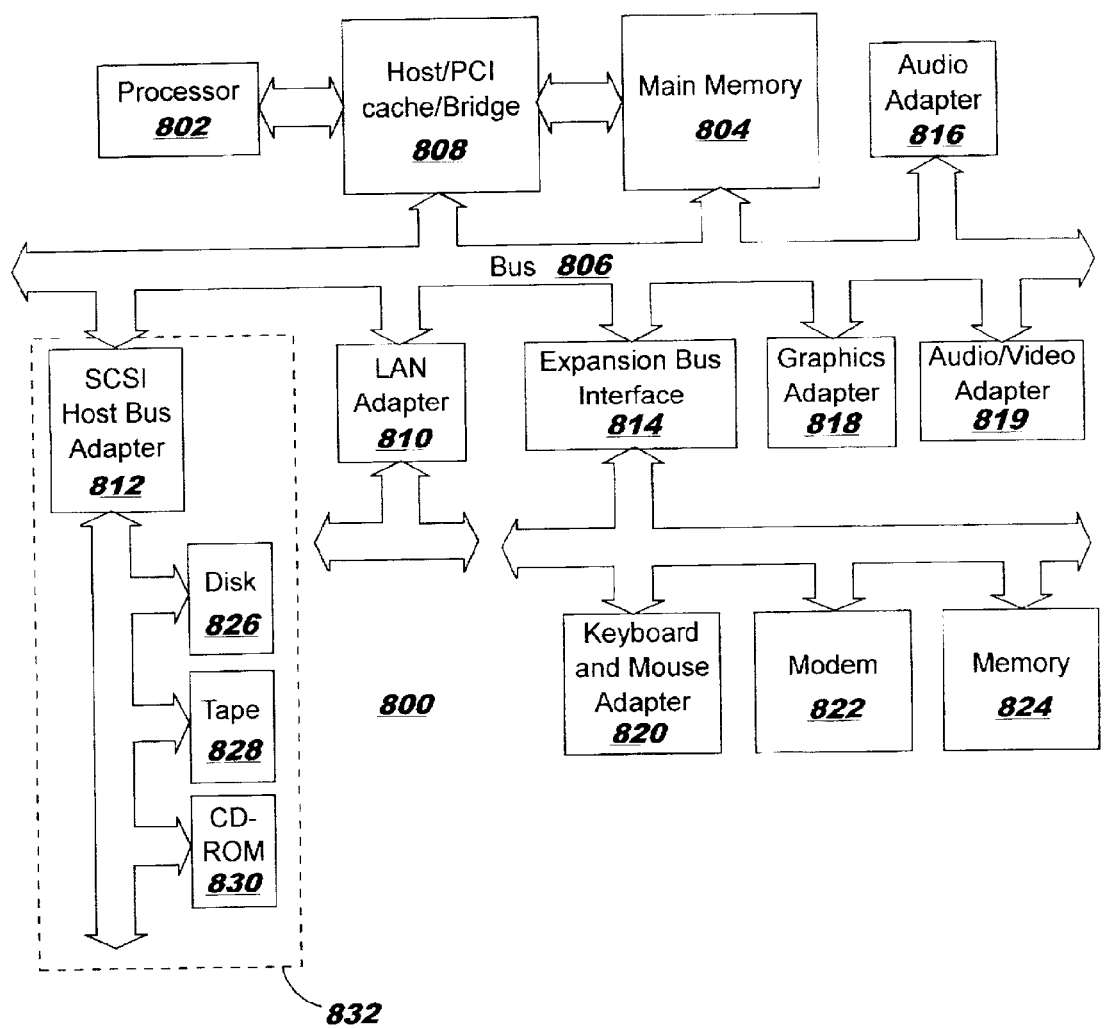
FIG. 8 is a block diagram of a data processing system which may be implemented as a client in which the present invention may be included in accordance with the present invention.

FIG. 8 illustrates a block diagram of a data processing system in which the present invention may be implemented. Data processing system 800 is an example of a client computer. Data processing system 800 employs a peripheral component interconnect (PCI) local bus architecture. Although the depicted example employs a PCI bus, other bus architectures, such as Micro Channel or ISA, may be used.

Processor 802 and main memory 804 are connected to PCI local bus 806 through PCI bridge 808. PCI bridge 808 may also include an integrated memory controller and cache memory for processor 802. Additional connections to PCI local bus 806 may be made through direct component interconnection or through add-in boards. In the depicted example, local area network (LAN) adapter 810, SCSI host bus adapter 812, and expansion bus interface 814 are connected to PCI local bus 806 by direct component connection. In contrast, audio adapter 816, graphics adapter 818, and audio/video adapter (A/V) 819 are connected to PCI local bus 806 by add-in boards inserted into expansion slots. Expansion bus interface 814 provides a connection for a keyboard and mouse adapter 820, modem 822, and additional memory 824.

In the depicted example, SCSI host bus adapter 812 provides a connection for hard disk drive 826, tape drive 828, CD-ROM drive 830, and digital video disc read only memory drive (DVD-ROM) 832. Typical PCI local bus implementations will support three or four PCI expansion slots or add-in connectors.

An operating system runs on processor 802 and is used to coordinate and provide control of various components within data processing system 800 in FIG. 8. The operating system may be a commercially available operating system, such as Windows 2000, which is available from Microsoft Corporation. Windows is a trademark of Microsoft Corporation. In a preferred embodiment, the operating system is a UNIX-type operating system.

An object oriented programming system, such as Java, may run in conjunction with the operating system, providing calls to the operating system from Java programs or applications executing on data processing system 800. Instructions for the operating system, the object-oriented operating system, and applications or programs are located on a storage device, such as hard disk drive 826, and may be loaded into main memory 804 for execution by processor 802.

Those of ordinary skill in the art will appreciate that the hardware in FIG. 8 may vary depending on the implementation. For example, other peripheral devices, such as optical disk drives and the like, may be used in addition to or in place of the hardware depicted in FIG. 8. The depicted example is not meant to imply architectural limitations with respect to the present invention. For example, the processes of the present invention may be applied to multiprocessor data processing systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system input device comprising:
   a first control device for moving a cursor in accordance with a direction and magnitude of forces applied to said first control device;
   a second control device for controlling scrolling in accordance with a direction and magnitude of forces applied to said second control device; and
   means, responsive to selection of a single control, for switching functionality of said first control device with said second control device, wherein said second control device moves said cursor and said first control device controls scrolling when said functionality is switched,
   wherein the first control device and the second control device are integrated into a single input device, which is external to a housing of a data processing system and coupled to the data processing system.

2. The input device according to claim 1, wherein said means for switching functionality comprises a device driver.

3. The input device according to claim 1, wherein said single control is an icon displayed to a user for switching a function of said first control switch with a function of said second control switch.

4. The input device according to claim 1, further comprising a delete key.

5. A keyboard for inputting data into a data processing system, wherein the keyboard includes a plurality of keys, said keyboard comprising:
   a cursor control stick embedded within the plurality of keys for moving a cursor in accordance with a direction and magnitude of forces applied to said cursor control device;
   a scroll control stick embedded within the plurality of keys for controlling scrolling in accordance with a direction and magnitude of forces applied to said scroll control device;
   a device driver capable of switching functionality of said cursor control stick with said scroll control stick, responsive to selection of a single control, wherein said scroll control stick moves said cursor and said cursor control stick controls scrolling when said functionality is switched.

6. A mouse comprising:
   a delete key;
   a first control device for moving a cursor in accordance with a direction and magnitude of forces applied to said first control device;
   a second control device for controlling scrolling in accordance with a direction and magnitude of forces applied to said second control device; and
   means, responsive to selection of a single control, for switching functionality of said first control device with said second control device, wherein said second control device moves said cursor and said first control device controls scrolling when said functionality is switched.

7. A method in a data processing system including an input device, said method comprising the steps of:
   establishing a first control device and a separate, second control device in said input device, wherein the first control device and the second control device are integrated into a single input device, which is external to a housing of the data processing system and coupled to the data processing system;
   associating a first controller included within a device driver with said first control device, said device driver for permitting communication with said input device, wherein said first controller permits communication with said first control device;
   associating a second controller included within said device driver with said second control device, wherein said second controller permits communication with said second control device;
   receiving a selection of a single control; and
   in response to said selection of a single control, associating said second controller with said first control device and associating said first controller with said second control device, wherein said second controller permits communication with said first control device and said first controller permits communication with said second control device.

8. The method according to claim 7, wherein the single control is a switch icon displayed to a user for receiving said indication to switch functions.

9. The method according to claim 7, wherein the step of associating said first controller with said first control device further comprises the step of associating said first controller with said first control device, said first controller for controlling movement of a cursor.

10. The method according to claim 7, wherein the step of associating said second controller with said second control device further comprises the step of associating said second controller with said second control device, said second controller for controlling scrolling.

* * * * *